(12) United States Patent
Nowka (10) Patent No.: US 8,121,957 B1
(45) Date of Patent: Feb. 21, 2012

(54) DISCRETE VERIFICATION OF PAYMENT INFORMATION

(75) Inventor: Andrew J. Nowka, Mountain View, CA (US)

(73) Assignee: Google Inc., Mountain View, CA (US)

( * ) Notice: Subject to any disclaimer, the term of this patent is extended or adjusted under 35 U.S.C. 154(b) by 909 days.

(21) Appl. No.: 11/865,453

(22) Filed: Oct. 1, 2007

(51) Int. Cl.
*G06Q 20/00* (2006.01)

(52) U.S. Cl. .................. 705/75; 705/64; 726/2

(58) Field of Classification Search .......... None
See application file for complete search history.

(56) References Cited

U.S. PATENT DOCUMENTS

| 6,529,885 | B1 * | 3/2003 | Johnson ........................ 705/64 |
| 7,275,685 | B2 * | 10/2007 | Gray et al. .................... 235/380 |
| 2002/0194119 | A1 * | 12/2002 | Wright et al. ................... 705/38 |
| 2004/0028199 | A1 * | 2/2004 | Carlson ...................... 379/93.21 |
| 2004/0193553 | A1 * | 9/2004 | Lloyd et al. ..................... 705/78 |
| 2006/0023694 | A1 * | 2/2006 | Wilson et al. ................. 370/352 |

* cited by examiner

*Primary Examiner* — Calvin L Hewitt, II
*Assistant Examiner* — Tsan-Yu J Huang
(74) *Attorney, Agent, or Firm* — Fish & Richardson P.C.

(57) ABSTRACT

In a computing system, in response to an order placed by a customer, a request for verification information is received from a merchant. Customer information is communicated to an issuing organization associated with the customer, while the information is withheld from the merchant. The merchant is connected for communication with the issuing organization for verification of information associated with the order.

18 Claims, 6 Drawing Sheets

DISCRETE VERIFICATION OF PAYMENT INFORMATION

TECHNICAL FIELD

This disclosure relates to verifying payment information, such as for sales orders, without disclosing consumer account information to a merchant.

BACKGROUND

So-called "identity theft" has become an increasingly severe problem in our society. Identity theft includes the unauthorized use of another's personal information for unlawful purposes. Two types of identity theft are "credit card fraud" and "loan fraud." With credit card fraud, a thief obtains another person's credit card number, and possibly additional credit-card-related information or personal information, and uses it to fraudulently purchase goods for their benefit, leaving the true credit card owner, the merchant who sold the goods, or the credit-card issuer to absorb the bill for the improperly obtained goods. With loan fraud, the thief uses another's personal information to apply for a loan, typically hoping to receive cash or credit from a loan provider or issuing bank but never intending to repay the loan or exercised credit. The person whose information was improperly used, even if they are excused from repaying the fraudulent bill or loan, may experience a variety of problems and inconveniences. Adverse consequences to one's credit rating may result, and remedying the issues may require an immense amount of time, effort, and expense.

Individuals' personal information, including credit card numbers, may be compromised in a variety of ways, which may lead to identity theft of the type described above. In some cases, a person may be aware that his or her personal information has been compromised, such as if a thief abducts the person and steals his or her wallet or purse. Other times, however, the person may be unaware that his or her personal information has been compromised. For example, a thief may rummage through the person's discarded trash in search of financial documents containing sensitive personal information that can be exploited. A recent trend in the area of identity theft involves an unscrupulous employee of a business that has access to credit card numbers or other sensitive customer information illicitly obtaining the credit card numbers or other information and using it for nefarious purchases, establishing fraudulent credit, or selling the information to others who intend to do the same.

To avoid the headaches and frustration that can accompany investigating, isolating and remedying the effects of these types of crimes, individuals may wish to safeguard their personal information, including credit card number information. One way that this might be done is to pay for all purchases using cash, so as to avoid using credit cards and the possibility that one's credit card number may be stolen. However, this is increasingly unrealistic for many consumers. For one thing, carrying a large amount of cash involves a different set of risks, including the risk of robbery, pick-pocketing, losing the money, or not having enough cash on hand to cover a purchase. In addition, the inconvenience of attempting to carry a sufficient amount of cash for routine daily and unexpected purchases may become tedious. As a result, despite the risks associated with dispersing sensitive personal information, many people increasingly rely on one or more credit cards for making daily purchases.

Some transactions may not typically be completed using cash, such as online purchases. In executing an online purchase, a consumer may access a business's online store, select an item for purchase, and provide a name, billing address, shipping address, e-mail address, phone number, and credit card number, for example. If the business is suspicious that the order is fraudulent, an employee of the business may call an issuing bank that issued the credit card, and may ask for verification information associated with the credit card number provided by the consumer. Before the issuing bank provides such information, the issuing bank may ask for the credit card number and consumer identification information. The business's employee may then respond with the requested information, the business having collected the information when receiving the order, and the issuing bank may provide the verification information. However, this typical online purchase scenario may expose the consumer to heightened risk of identity theft, credit card fraud, or loan fraud because the customer's sensitive information is provided and available to the business, including employees having access to the information, which may increase the likelihood that the information may be misused.

SUMMARY

Systems and methods are disclosed for verifying payment information for transactions, such as sales transactions, without disclosing consumer account information to a merchant.

In a first general aspect, a computer-implemented method includes receiving, in response to an order placed by a customer, a request for verification information from a merchant. The method also includes communicating customer information to an issuing organization associated with the customer while withholding the information from the merchant. The method further includes connecting the merchant for communication with the issuing organization for verification of information associated with the order.

In various implementations, communicating customer information to the issuing organization while withholding the information from the merchant may be transparent to the merchant, and may include establishing a connection between the merchant and the issuing organization and muting the merchant during the communicating of customer information to the issuing organization. Connecting the merchant for communication with the issuing organization may include establishing a voice-over-internet-protocol connection between the merchant and the issuing organization. An indication of whether to complete or abort the transaction may be received from the merchant after connecting the merchant. Information associated with the order may be received, and a risk value associated with the order may be determined. The risk value may be used to advise completing or aborting the order. The customer information may include a credit card number or a bank account number, and the issuing organization may be associated with the customer because it issued the credit card number or the bank account number to the customer. The verification of information may include verifying an address or credit card information. An indicator may be assigned based on a communication between the merchant and the issuing organization. The request for verification information may include an identifier associated with the order that is used to access the customer information.

In a second general aspect, a computer program product tangibly embodied in a computer-readable medium includes instructions that when executed by a processor perform a method. The method includes receiving, in response to an order placed by a customer, a request for verification information from a merchant. The method also includes communicating customer information to an issuing organization associated with the customer while withholding the information from the merchant. The method further includes connecting the merchant for communication with the issuing organization for verification of information associated with the order.

In various implementations, communicating customer information to the issuing organization while withholding the information from the merchant may be transparent to the merchant, and may include establishing a connection between the merchant and the issuing organization and muting the merchant during the communicating of customer information to the issuing organization. Connecting the merchant for communication with the issuing organization may include establishing a voice-over-internet-protocol connection between the merchant and the issuing organization. The request for verification information may include an identifier associated with the order that is used to access the customer information. Information associated with the order may be received, and a risk value associated with the order may be determined.

In a third general aspect, a system includes a communications interface to communicate with a merchant and an issuing organization, and a database that stores information submitted by customers. The system also includes means for communicating customer information to an issuing organization associated with the customer while withholding the information from the merchant in response to receiving a request for verification information from the merchant.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
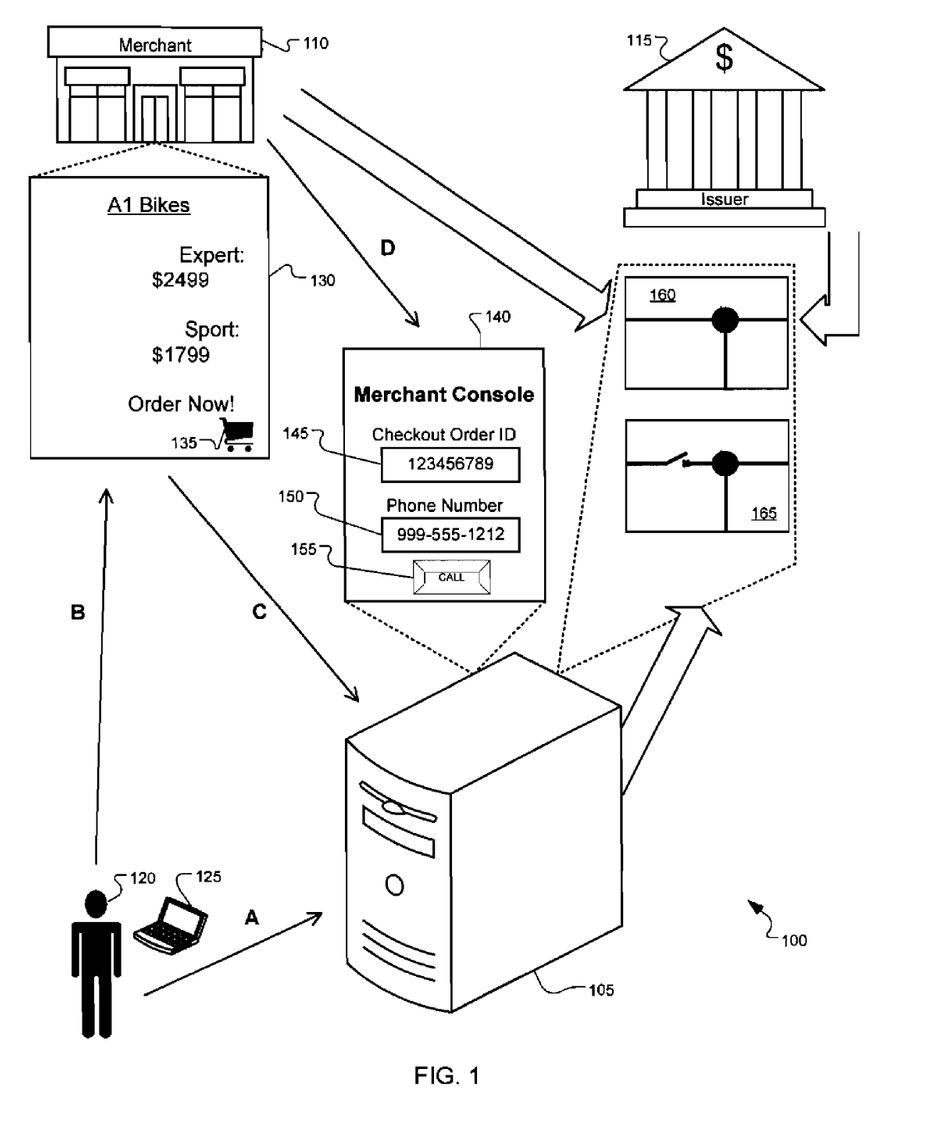
FIG. 1 is a block diagram of an exemplary payment information verification system that can be used to verify payment information relating to a sales order.

FIG. 1 is a block diagram of an exemplary payment information verification system 100 that can be used to verify payment information relating to a sales order. In general, the system 100 may permit a merchant to verify that a customer is probably legitimate without having to share certain private information about the customer with the merchant. In this manner, if the merchant is operated by a dishonest person or employs a dishonest person, private information will not get to the merchant.

In an implementation, a transaction processor 105 may communicate with a merchant 110 and an account issuer 115 to verify information and present a verification to the merchant 110 such that a sales transaction may be completed between a customer 120 and the merchant 110. The sales transaction may be for goods or services that the merchant 110 offers for sale, and for which the customer 120 tenders some form other than cash, such as a credit card number, a debit card number, or a bank account number, to list just a few examples. The issuer 115 may have previously provided the customer 120 with an account, such as, without limitation, a credit card account, a debit card account, a consumer loan, a home-equity loan or line of credit, or a bank account. As payment to the merchant 110 for the transaction, the customer 120 may draw on the account from the issuer 115, according to an implementation.

When a credit card transaction is processed online, merchants 110 may assume liability for processing the transaction if the credit card or card number has been stolen and is being used by a fraudulent consumer. In an implementation, the merchant 110 may have suspicions or concerns that a received sales order is fraudulent, and may be unwilling to fulfill the order without conducting a risk analysis. As part of the analysis, the merchant 110 may wish to verify details relating to the order or to the customer's account with the issuer 115. According to an implementation, the transaction processor 105 may provide verification information from the issuer 115 to the merchant 110 without disclosing customer information to the merchant 110. As such, customer privacy may be preserved, which may reduce a risk that sensitive customer information may be compromised. Also, the transaction processor 105 may restrict access to sensitive customer information, which may enhance security surrounding customer accounts. As a result, customers 120 may be at a reduced risk of becoming victims of identity theft, credit card fraud, or loan fraud. Additionally, the transaction processor 105 may provide authorization and settlement of actual order payments, and may provide risk services designed to identify suspicious transactions, according to some implementations.

Because of the risk of identity theft, credit card fraud and loan fraud, customers 120 may have reservations about providing sensitive personal information to merchants 110. For example, a customer 120 may fear that if they provide a credit card number, credit card expiration date, social security number, address, phone number, birth date, password, or other sensitive information to a merchant 110, that such information may eventually be compromised in some fashion. Some merchants 110 may have privacy policies that forbid selling or disclosing customer information to third parties, but these policies may not prevent unauthorized distribution or theft of the information by a dishonest employee who has access to the information, for example, or by an unaffiliated thief who hacks into the merchant's computer system and steals the information.

In general, transaction processor 105 is operated by a known and trusted organization to which a customer 120 feels comfortable providing personal information. By having to concern themselves only with determining the bona fides of the transaction processor 105, but not having to research every vendor they may pay, a customer 120 may save time and effort, and more readily agree to have monetary transactions handled by a system such as system 100. As such, the customer 120 may register and disclose sensitive personal information once, with the secure transaction processor 105, rather than doing so multiple times with multiple merchants 110 that may or may not be secure. Merchants 110 may also benefit in the form of additional orders, as larger numbers of customers 120 may prefer to purchase from the merchant 110 through the secure transaction processor 105. Additionally, merchants 110 may be relieved of storing customer information, which may reduce infrastructure costs for the merchant 110 and may advantageously permit the merchant 110 to focus on selling product. Merchants 110 may integrate with the transaction processor 105 (as by agreeing to receive customer orders from the processor 105), and may offer customers 120 the opportunity to securely purchase products from their online store through the transaction processor 105, according to an implementation. In an implementation, a merchant 110 may agree to order collection and payment processing through the transaction processor 105, such that sensitive customer information may not be shared with the merchant 110.

In an implementation, a customer 120 may provide the transaction processor 105 with information, as illustrated by arrow "A" in FIG. 1, and the transaction processor 105 may store the information in a secure fashion. For example, the customer 120 may register for an account with the transaction processor 105. In registering for the account, the customer 120 may supply the transaction processor 105 with a name, address, phone number and one or more credit card numbers and expiration dates, and may select or be issued a user name, an account password, a personal identification number (PIN), or some combination of the above, according to an implementation. In some implementations, personal or account-related information may also be provided. The transaction processor 105 may store this information securely and restrict access to it, such that unauthorized access to the information may be prohibited and prevented. In one implementation, the transaction processor 105 may store the information in a database and may prevent human access to the customer information.

In an implementation, the transaction processor 105 may provide services to customers 120 and to merchants 110 by providing a safe and secure environment for online transactions between customers 120 and merchants 110. Suppose, for example, that a customer 120 is interested in using a credit card to purchase a mountain bike from an online retailer. In an implementation, the customer 120 may use a network-enabled computing device (e.g., a laptop computer 125 communicably coupled to the Internet, or a mobile device such as a smartphone), to access a search engine, such as Google Search, to identify online merchants that sell mountain bikes. When the search results appear, the user may access a merchant's online site 130, as illustrated by arrow "B" in FIG. 1, and may browse through listings of various mountain bikes on the site 130. In this example, the user 120 may be interested in purchasing a full-suspension mountain bike suited for riding off-road, cross-country mountain bike trails. After locating an appropriate mountain bike on the merchant's site 130 (e.g., the "Expert" model for $2499), the user 120 may select a checkout icon 135 associated with the transaction processor 105, according to an implementation. In FIG. 1, the exemplary checkout icon 135 is shown as a shopping cart, but the icon may take any appropriate shape or form in other implementations, including a button or selectable text.

The transaction processor 105 may receive order information, such as an item identifier that describes the selected bike in this example, the purchase price and any additional charges, a merchant identifier, an order identification number, and a customer identifier, as illustrated by arrow "C" in FIG. 1. The transaction processor may also capture additional information associated with the customer 120 or the customer's computing device 125, such as an IP address associated with the computing device 125 that the customer 120 used to place the order, or an electronic cookie stored at the customer's computing device 125. The merchant identifier may be a number or an alphanumeric string that identifies the merchant 110 to the transaction processor 105. In an implementation, the merchant 110 may be issued a merchant identifier when the merchant 110 integrates or registers with the transaction processor 105, for example. The customer identifier may be the customer's name in some implementations. In other implementations, the customer identifier may be a combination of a user name and password, such as the user name and password that the customer 120 selected when establishing the account with the transaction processor 105 (described above and shown as arrow "A"), or a PIN number. In yet other implementations, the transaction processor 105 may collect an electronic identifier from the user's computing device 125 and use the identifier to access the user's registration information, such that the user 120 may not enter any identifying information while placing the order.

When the order is placed, the merchant 110 may receive basic information, such as a description of the item ordered, the purchase price, and the order identification number, but may not receive sensitive customer-specific information or customer account information, according to an implementation. As such, customer privacy may be preserved and dispersion of sensitive customer information may be minimized. For example, the merchant 110 may not receive the customer's full sixteen-digit credit card number, according to an implementation.

The transaction processor 105 may then use the received information to process the order. For example, in an implementation where the transaction processor 105 receives the customer's user name and password, the transaction processor 105 may use the user name, password, or both, to access the securely stored user registration information. Similarly, in implementations where a PIN number is received or where an electronic identifier is collected from the user's machine 125, the processor 105 may access the user's personal information based on an association that may have been previously made (e.g., when the customer 120 registered), for example. In other implementations, the customer 120 may enter name, address, phone number, credit card number, credit card expiration date, CVV number, etc., while placing the order, and this information may be sent to the transaction processor 105 (arrow "C"). In these implementations, the transaction processor 105 may compare the information to the registration information, for example, and may flag discrepancies.

In some implementations, the transaction processor 105 may seek authorization from the issuer 115 before proceeding. For example, the transaction processor 105 may send customer account information to the issuer 115. The issuer 115 may conduct CVV and AVS checks in some implementations, and may authorize the transaction processor 105 to process the transaction. In doing so, the issuer 115 may assume all risk associated with the transaction, according to one implementation. In other implementations, the issuer 115 may authorize the transaction and assume credit risk associated with the transaction, but may not assume any fraud risk associated with the transaction, and may defer such risk to the transaction processor 105. Because the issuer 115 provided the customer 120 with the account (e.g., credit card, debit card, etc.), the issuer 115 already has access to the sensitive customer information, so sharing this information with the issuer 115 may not increase the risk of compromising sensitive customer information, according to an implementation.

In an implementation, the transaction processor 105 may use information received with the order, the collected information, or the accessed user registration information to perform a risk analysis in an attempt to determine a likelihood that the order is fraudulent. In some implementations, the transaction processor 105 may perform the risk analysis on all received orders; in other implementations, the transaction processor 105 may perform the risk analysis only when the issuer 115 does not fully guarantee the order, and passes some risk back to the processor 105. In an implementation, the transaction processor 105 may perform the risk analysis to identify low-risk orders that it may still guarantee and higher risk orders that it may not guarantee.

Risk analysis procedures can vary in complexity, and many alternatives exist. For example, the transaction processor 105 may compare a geographic location indicated by the IP address of the computer 125 used to place the order with the customer-supplied registration address or with the entered shipping address. If the addresses indicate the same geographic area, this may point to a legitimate order, as opposed to one that is fraudulent. If, however, the addresses indicate different geographic areas, this may suggest a likelihood of a fraudulent order, especially if the order specifies that the goods are to be shipped to an address different from the registration address. Also, a further analysis of other order parameters such as by an ID number for the goods order, may permit further refining of the analysis. For example, a purchase of gasoline far from home may not look fraudulent, but a purchase of a washer and dryer far from home would.

At this point, the transaction processor 105 may determine that the order is sufficiently risky and may advise the merchant 110 that the merchant 110 must accept the risk of fraud and the associated liability if the merchant 110 wishes to complete the transaction. In an implementation, the transaction processor 105 may decline to guarantee the order in such a situation. In some implementations, the transaction processor 105 may provide the merchant 110 with customer billing detail, customer shipping detail, and in some cases with the customer phone number, so that the merchant may process the order if it wishes to. The merchant 110 may not be provided, however, with sensitive customer information, such as the credit card number used to place the order, according to an implementation.

In an implementation, the merchant 110 may then decide whether or not to complete the transaction, and may perform a risk assessment of its own. In some cases, the merchant 110 may decide to simply cancel the order. This may occur, for example, if the expected profit on the order is less than the cost to investigate the risk level. In many cases, however, the merchant 110 may wish to investigate to determine whether to accept the order and complete the transaction or not, as it may be in the merchant's business interest to frequently incur the liability risk and accept non-guaranteed orders up to a certain risk level, rather than canceling all non-guaranteed orders. For instance, a merchant 110 may find that, over time, accepting non-guaranteed orders up to a certain risk level and completing the transaction for those orders is more profitable than canceling all such orders, even if a certain percentage of such orders are fraudulent and result in losses on some transactions.

As part of its risk assessment analysis, the merchant 110 may wish to obtain verification information. The transaction processor 105 may provide and maintain a merchant console 140, according to an implementation. In an implementation, the merchant 110 may access the merchant console 140 provided by the transaction processor 105, as indicated by arrow "D" in FIG. 1. The exemplary merchant console 140 shown in FIG. 1 is hosted on a web site, accessible by a computing device over the Internet or other network or combination of networks, for example, according to an implementation. Using the merchant console 140, the merchant 110 may enter the associated order identification number 145 and a phone number 150 at which the merchant 110 can be reached. The merchant 110 may then select a control 155 to send the information, and the transaction processor 105 may receive the information.

In an implementation, click-to-call techniques may be used to send the information to the transaction processor 105, such as after the merchant 110 selects the control 155 in this example. As mentioned, the merchant console 140 shown in FIG. 1 is exemplary. In some implementations, the transaction processor may store the merchant's phone number 150, and the checkout ID 145 may encode a merchant identifier. In these implementations, the merchant 110 may not provide a phone number 150, as the transaction processor 105 may decode the checkout ID 145 to determine the merchant 110 and look-up the stored number. In yet other implementations, the processor 105 may not store the merchant's phone number, but may access the number from a published list. In some implementations, additional information may be provided to the transaction processor 105 through the merchant console 140, such as a merchant PIN number, or user name and password, to list just a few examples.

The merchant console 140 may be implemented in a variety of ways using any suitable communications techniques. For example, rather than maintaining a web site that accepts text entries, the transaction processor 105 may maintain a voice response system that receives spoken information, and which the merchant may access, for example, by phone or by microphone-enabled, networked computing device. In other implementations, the merchant 110 may use any other suitable communication mechanisms, such as sending an email, fax, or SMS message to the transaction processor 105, or may phone or text-message the information, to list just a few examples.

The transaction processor 105 may use the received order identification number 145 or other received information to access or look up information associated with the order, including customer information such as the credit card number used to place the order, and the expiration date of the credit card, according to an implementation. In an implementation, the transaction processor 105 may have stored this information at the time that the order was received and associated it with the order identification number. The transaction processor 105 may determine a bank identification number (BIN) from the credit card number, according to an implementation. The BIN number may identify the issuer 115 that issued the credit card to the customer 120. The transaction processor may then look up a published phone number for the issuer 115 or retrieve a stored phone number for the issuer, for example from a memory location within or outside of the transaction processor 105.

The transaction processor 105 may then provide verification information to the merchant 110, according to an implementation. In one implementation, the transaction processor may initiate a three-way call between the merchant 110, the issuer 115, and the transaction processor 105. In an implementation, this may be done using click-to-call techniques and establishing a voice-over-internet protocol (VoIP) call connection. This is represented in FIG. 1 by illustrative connection 160, which shows the merchant 110, the issuer 115, and the transaction processor 105 all connected as part of the three-way call. In an implementation, the merchant 110 may describe itself as transaction-processor client to the issuer 115, and may request that the issuer 115 select a prompt. As an example, the merchant 110 may request that the issuer select a "1" button on the phone, keypad, or keyboard. The issuer 115 may do so, and the transaction processor 105 may, in response, mute the merchant 110 from the call, as illustrated by illustrative connection 165 in FIG. 1.

Connection 165 shows that the transaction processor may open a switch to mute the merchant 110 from the three-way call, which may permit the transaction processor 105 and the issuer 115 to communicate privately, for example. (In a typical implementation, the switch would not be physical, and is shown here by analogy for illustration.) This may prevent the merchant 110 from hearing information exchanged between the transaction processor 105 and the issuer 115, according to an implementation. In an implementation, this process may be transparent to the merchant 110, such that the merchant 110 is not made overtly aware that it is being screened from the information. For example, during the time that the transaction processor is providing information only to the issuer 115, it could also contemporaneously conduct a separate dialog with the merchant 110 or otherwise engage the merchant 110. Connections 160 and 165 are illustrative, and may represent one or more physical connections within or outside of the transaction processor 105, for example, or may represent one or more communication paths or circuits between one or more of the merchant 110, the issuer 115, and the transaction processor 105.

According to an implementation, when the merchant 110 has been muted, as by opening a switch and temporarily severing the connection with the merchant 110 (e.g., connection 165), the transaction processor 105 may provide the credit card number and expiration date, as well as the merchant identifier in some implementations, to the issuer 115. In some implementations, only the credit-card number and expiration date may be provided. When the issuer 115 receives this information, the issuer 115 may be satisfied that the merchant 110, by way of the transaction processor 105, is fit to receive the verification information for the customer account. At this point, the transaction processor 105 may once again re-establish connection with the merchant 110, such as by closing the switch to re-connect the merchant 110 to the call, as illustrated by connection 160 in FIG. 1. The issuer 115 may provide verification information to the merchant 110 through the transaction processor 105. This may permit the merchant 110 to make an informed decision regarding whether to complete the transaction or not. For example, the issuer 115 may confirm the customer's phone number, and whether the shipping address is a registered address for the customer 120, or whether the account has seen a recent address change. At any point throughout the verification information request and delivery process, the transaction processor 105 may maintain one or more status indicators, for example to track the progress of the inquiry and delivery. Such information may be useful, for example, in refining aspects of the transaction processor 105 operation.

In some implementations, the issuer 115 may provide only "yes" or "no" answers in response to questions, and may refuse to give out detailed information, such as a phone number or address. In other implementations, the issuer 115 may share this information. Thus, the merchant 110 may receive the verification information needed to determine whether to complete the transaction, while still being shielded from sensitive customer information. As such, customer privacy may be preserved while still meeting the merchant's needs in obtaining verification information from the issuer 115.

Many alternatives are possible in providing the verification information discussed above. For example, rather than using phone lines or VoIP connections to communicably link one or more of the merchant 110, issuer 115 and transaction processor 105, any suitable communications means, including those mentioned above, may be used. For instance, fax, e-mail, SMS messaging, text messaging, network access over public or private networks, and the like may be used. Additionally, the process may be partially or fully automated. In some implementations, a human operator at the merchant end may speak to a human operator at the issuer end (for example, when the transaction processor facilitates connection 160). In other implementations, the issuer 115, transaction processor 105, or both, may include automated voice-response systems so that a human operator at the merchant end could speak information to the transaction processor 105 or the issuer 115, and appropriate action could be taken.

Fully automated systems may also be used. A computerized risk assessment system at the merchant could access the merchant console 140 at the transaction processor 105 and request verification, including providing some of all of the information as described above in reference to the merchant console 140. The transaction processor 105 could process the request (for example, as described above) and contact an automated system at the issuer 115. The transaction processor 105 could provide information to the issuer 115 sufficient to convince the issuer 115 that the merchant 110 may receive verification information. Then automated issuer system may then provide verification information to the merchant system through the transaction processor 105, according to an implementation.

Figure 2:
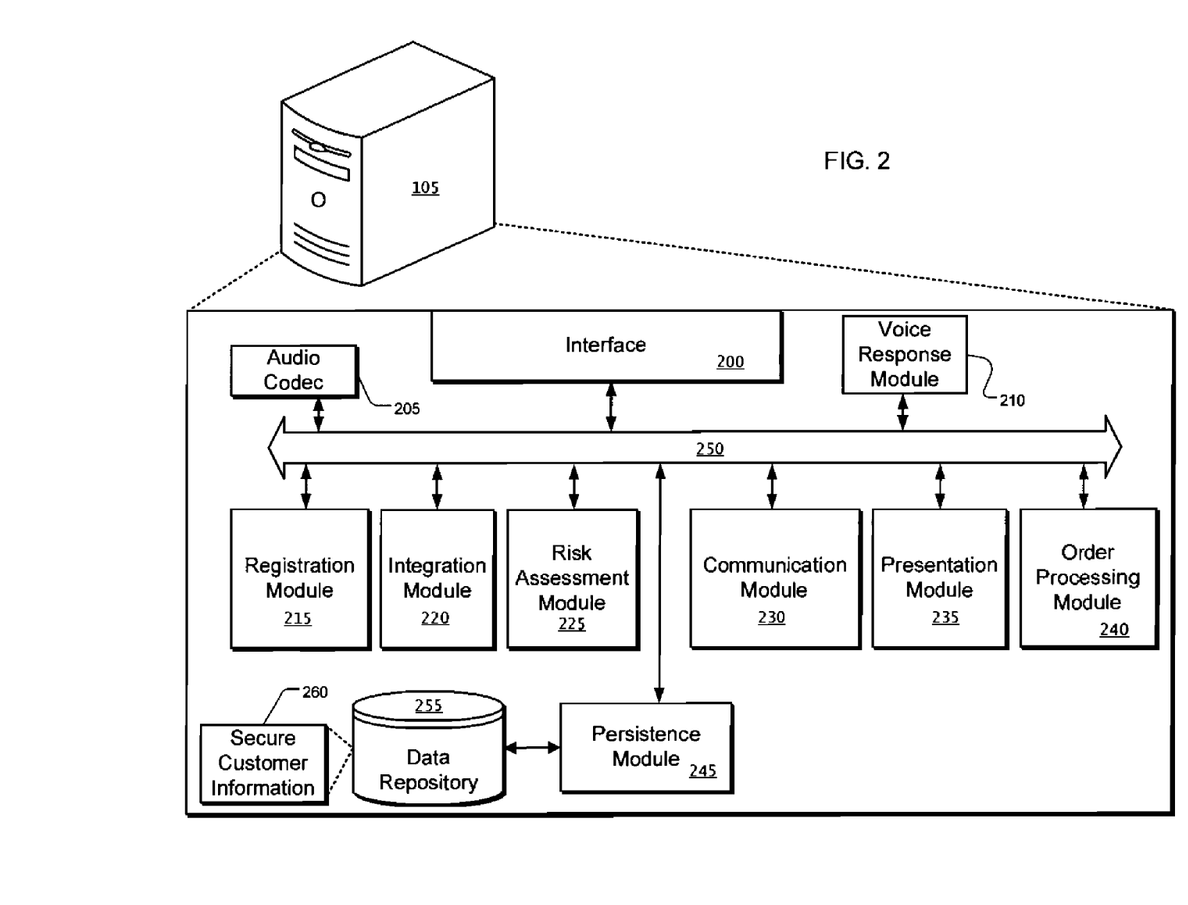
FIG. 2 is a block diagram of a transaction processor, like that shown in FIG. 1.

FIG. 2 is a block diagram of a transaction processor such as transaction processor 105 from FIG. 1. In an implementation, the transaction processor 105 may be a software application program running on a computing device, such as a one or more server devices, computers (e.g., desktop personal computer or laptop), or any other suitable computing device. In some implementations, the transaction processor 105 may include one or more hardware modules operating in concert with software modules to implement the functionality described herein. An example of the computing device that the transaction processor may execute on is described in more detail below with respect to FIG. 6.

The exemplary transaction processor 105 shown in FIG. 2 includes an interface 200, an audio codec 205, a voice-response module 210, a registration module 215, an integration module 220, a risk assessment module 225, a communication module 230, a presentation module 235, an order processing module 240, and a persistence module 245, all coupled to a communications bus 250. The communications bus 250 may permit any of the modules to communicate with one another, according to an implementation. The transaction processor 105 also includes a data repository 255 that may be used to securely store customer information 260.

In various implementations, interface module 200 may be used to transmit and receive messages over a network, such as one or more local area networks (LANs), wide area networks (WANs), virtual private networks (VPNs), the Internet, wired or wireless phone networks, or others. In an implementation, the interface module 200 may permit the transaction processor 105 to communicate with other computing devices, such as a computing device at the merchant 110 site, a computing device at the issuer 115 site, or a computing device 125 that a customer 120 may use. Such communication may occur over wire-line or wirelessly, depending on the implementation. The interface module may format messages for transmission and may interpret received messages, according to an implementation.

The communication module 230 may establish and manage connections for communicating with other devices over a network. Using the communication module 230 (and interface 200), the transaction processor 105 may communicate with computing devices, including servers, desktop or laptop computers, handheld computing devices, fax machines or phones. For example, the communication module 230 may assemble a message to be sent through the interface to another computing device, and may receive messages through the interface 200 sent from other computing devices, and may interpret those received messages. Referring again to FIG. 1, the transaction processor 105 may communicate over a network with a computing system at the merchant 110, at the issuer 115, or with a customer computing device 125.

The registration module 215 may receive and manage customer information. A customer 120 may enter information to open an account, as described above, and the registration module 215 may coordinate the information, and may pass the information to the persistence module 245 to be securely stored in a data repository. The persistence module 245 may manage the storage of electronic content to a data repository, such as data repository 255 or another data repository within or outside of the transaction processor 105. The persistence module 245 also may search a database of information by querying the database (e.g., a database stored on the data repository 255), and may receive results from the database. In an implementation, the registration module 215 may receive customer information, including sensitive customer financial or personal information, and may direct the persistence module 245 to securely store the information in the data repository 255. The persistence module 245 may then store the information 260 securely so that unauthorized access to the secure customer information 260 is not permitted.

The integration module 220 may manage the integration process whereby merchants 110 may register with the transaction processor 105 to sell their products or services through the transaction processor 105. In similar fashion to the customer information, the merchant integration information may be stored to the data repository 255 through the persistence manager 245.

The risk assessment module 225 may perform tests or checks on collected information and may compare collected information to customer information 260. In an implementation, the risk assessment module 215 may investigate an IP address assigned to the computer 125 that the customer 120 used to place an order to see if it corresponds to the registration address that the customer entered at registration, which may be stored with the customer information 260.

The presentation module 235 may be used to render views for display on display devices of computing devices. For example, the presentation module 235 may be used to render the merchant console 140 (see FIG. 1) or a integration view on a display device at the merchant 110, or may be used to render a registration view on a display of a computing device 125 used by a customer 120. In some implementations, the presentation module 235 may render views for display at the issuer 115, the merchant 110, or both, for example in connection with providing verification information from the issuer 115 to the merchant 110.

The order processing module 240 may receive order information and process payments, according to an implementation. In some implementations, the order processing module 240 may work in concert with the risk assessment module 225 to determine whether or not the transaction processor 105 will guarantee a transaction or not. In some implementations, this may involve communications with the issuer 115 or the merchant 110.

The voice response module 210 may work in concert with the audio codec 205 to convert digital information to audible information, and vice versa. The audio codec 205 may receive spoken information from a user (e.g., a customer 120, or an operator at the merchant 110 or issuer 115 locations) and convert it to usable digital information. The voice response module 210 may process and interpret the digital information for the transaction processor 105. The voice response module 210 may convert the received audible signals into electronic signals that can be understood by the various other modules of the transaction processor 105.

The audio codec 205 may likewise generate audible sound for a user, such as through a speaker, by converting electronic signals to audible waveforms that can be understood by a human. Such sound may include sound from voice telephone calls, may include recorded sound (e.g., voice messages) and may also include sound generated by modules or applications running on transaction processor device. In this fashion, communications may occur between any combination of human operator or machine system. The modules shown in FIG. 2 may be combined or separated in various manners, and may be distributed across one or more computing devices, according to some implementations. Also, some of the modules shown in FIG. 2 may be omitted in various implementations.

Figure 3:
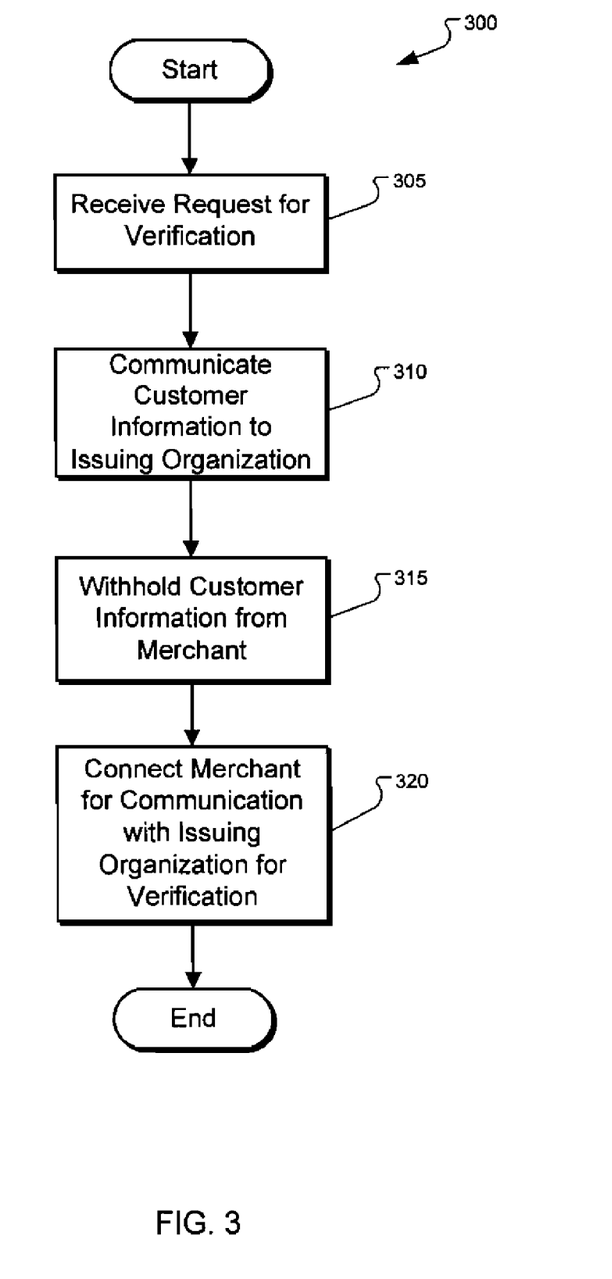
FIGS. 3-4 are flow charts of exemplary operations that can be performed by the transaction processor of FIGS. 1-2.

FIG. 3 is a flow chart 300 of exemplary operations that can be performed by the transaction processor 105 of FIGS. 1-2. The process 300 begins, at step 305, with receipt of a request for verification information from a merchant. For example, the transaction processor 105 may receive a request for verification from a merchant 110. The merchant 110 may request the verification information in response to a customer 120 placing an order for goods or services that the merchant 110 offers. In one implementation, the merchant 110 may access the transaction-processor-hosted merchant console 140, and may provide an order identification number 145 and a phone number 150. The transaction processor 105 may use the order identification number 145 to access information associated with the order, including a credit card number that the customer used to place the order, which the transaction processor 105 may have received when the order was placed. The transaction processor 105 may determine the associated issuing bank or issuing organization 115 from the BIN number of the credit card number, and may look up a published phone number for the issuing organization 115, according to an implementation.

The transaction processor 105 may then communicate customer information to an issuing organization associated with the customer at step 310. The issuing organization 115 may be associated with the customer 120, according to some implementations, as a result of issuing the customer an account, such as a credit card account, a bank account, or a loan or line of credit. In one implementation, the transaction processor 105 may initiate a three-way call between the merchant 110, the issuing organization 115 and the transaction processor 105 by contacting the merchant 110 and the issuing organization 115 using the phone number provided by the merchant 110 and the accessed issuing organization number, respectively.

Once connected, the merchant 110 may inform the issuing organization 115 that it wishes to verify customer information associated with an order. The issuing organization 115 may ask for the credit card number used to place the order. The merchant 110 may respond that it does not have access to the credit card number, but if the issuing organization 115 selects a prompt, such as pressing the "1" button on the phone, that the transaction processor 105 will provide the necessary information. The transaction processor may withhold the customer information from the merchant at step 315. For example, when the issuing organization 115 selects the prompt, the transaction processor 105 may mute or disconnect the merchant 110 from the call, and may provide the credit card number and any other requested customer information to the issuing organization 115. After receiving the requested information, the issuing organization 115 may be satisfied that the request for verification information is authorized. In some implementations, steps 310 and 315 can occur simultaneously.

Next, at step 320, the transaction processor may connect the merchant for communication with the issuing organization for verification. For example, the transaction processor 105 may bring the merchant 110 back into the three-way call, as by un-muting or reconnecting the merchant 110. The merchant 110 may then question the issuing organization 115 concerning the order, according to some implementations. Verification information may be provided by the issuing organization 115. In an implementation, the transaction processor 105 may provide the verification information by communicably connecting the merchant 110 and the issuing organization 115. In another implementation, the issuing organization 115 may convey the verification information to the transaction processor 105 and the transaction processor 105 may then convey the verification information to the merchant 110. In yet another implementation, the transaction processor 105 may supply the verification information itself. In some implementations, that issuing organization 115 may provide the merchant 110 with the verification information, and the transaction processor 105 may monitor the exchange of information, and may in some cases assign a status indicator based on the communications.

Figure 4:
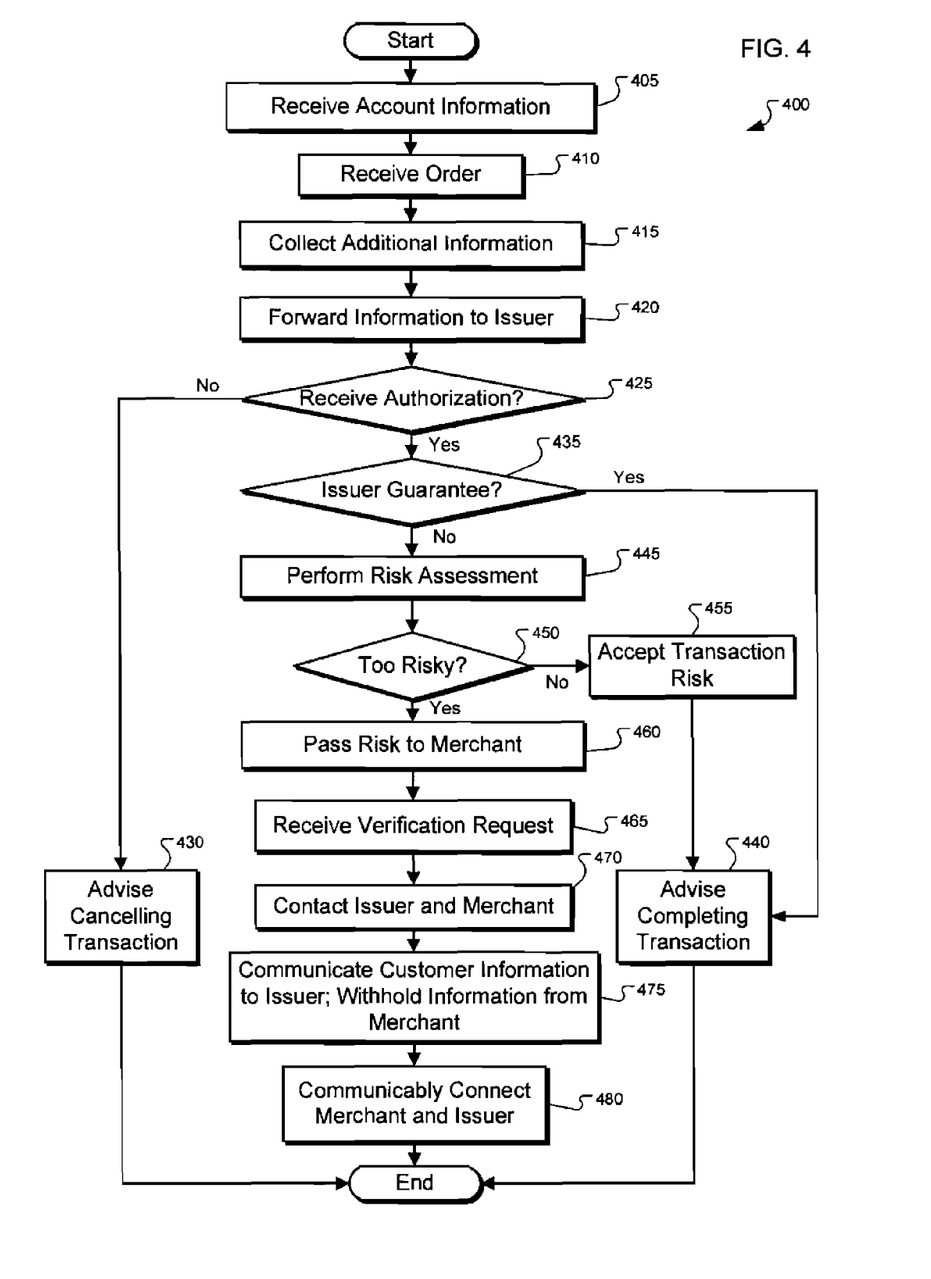

FIG. 4 is another flow chart of exemplary operations that can be performed by a processor like the transaction processor 105 of FIGS. 1-2. The process 400 begins, at step 405, with a receipt of account information. For example, a customer may open an account with the transaction processor and may provide registration information to the transaction processor, including one or more of the following: name, address, phone number, one or more credit card numbers, associated expiration dates and CVV numbers for the card numbers, and in some implementations a user name and password. At step 410, an order may be received. For example, a user may place an order at a web site of a merchant who has previously integrated with the transaction processor, and the transaction processor may receive the order information supplied by the user in placing the order. In one implementation, the user may place the order by selecting a checkout icon. In an implementation, the merchant may not receive certain customer information in the interest of preserving customer privacy by limiting merchant access to sensitive customer information. This limitation concerning the information that the merchant may receive may be conditional on the merchant integrating with the transaction processor, according to an implementation. Additional information may be collected (415). For example, the transaction processor may collect an IP address, a cookie, or other information associated with a computer that the user uses to place the order.

The transaction processor may forward information to an issuer at step 420. For example, the transaction processor may forward information received as part of the order, and may also forward information that had previously been stored by the transaction processor to an issuing bank or issuing organization. In an implementation, the issuer previously issued an account to the user, and the user used the account in placing the order. The issuer may process the information, and may provide the transaction processor with an authorization for the transaction. If an authorization for the transaction is not received at step 425, the transaction processor may advise the merchant to cancel the order at step 430, and the process ends. That is, the transaction processor may advise that the merchant not complete the transaction. In an implementation, the authorization may indicate that the credit card number is a valid account number.

If an authorization for the transaction is received at step 425, and if the issuer guarantees the transaction at step 435, the transaction processor may advise the merchant to complete the transaction at step 440, and the process ends. In an implementation, if the issuer guarantees the transaction, the issuer may accept risk that the order is fraudulent, and may agree to be liable if the transaction is processed and turns out to, in fact, be fraudulent. The issuer may guarantee a transaction if the issuer is confident that the order is legitimate based on received information.

If the issuer authorizes the transaction at step 425 but does not guarantee the transaction at step 435, the transaction processor may perform a risk assessment at step 445. In an implementation, if the issuer does not guarantee the transaction, the issuer may decline to accept the risk that the order is fraudulent, and may pass such risk and associated liability to the transaction processor and/or the merchant.

In performing the risk assessment (445), the transaction processor 105 may analyze collected information and may compare it to store information, including stored customer information. In an implementation, the transaction processor may perform a variety of risk assessment comparisons. For example, without limitation, the transaction processor may compare a collected IP address with a stored address, may compare a collected electronic cookie from the user's machine with a stored value, may compare an address or other indicator with a list of known bad addresses or indicators, may identify suspect regions, may analyze purchasing patterns for unusual or unexpected trends or purchases, and the like.

If the transaction processor determines that the order is not too risky at step 450, the transaction processor may choose to accept risk of fraud associated with the order and corresponding transaction at step 455, and may advise the merchant to complete the transaction at step 440, and the process ends. If instead, at step 450, the transaction processor determines that the order is too risky, the transaction processor may pass the risk that the order is fraudulent to the merchant at step 460. In an implementation, the merchant 110, faced with the prospect potential liability if the order is fraudulent, may desire to investigate information relating to the order.

At step 465, a verification request may be received. For example, the merchant may send a verification request to the transaction processor. One way that this may occur is by the merchant (such as an operator working from a computing device for the merchant, or an automated system) accessing a transaction processor-hosted merchant console 140 and requesting verification. In an implementation, the merchant may provide information to the processor, such as an order ID number. In some implementations, the merchant may also provide contact information, such as a phone number, an email address, a fax number, a pager number, or the like.

The transaction processor may use the order ID number to access stored information, such as information received with the order (step 410), including one or more of customer name, credit card number, bank account number, etc., expiration date, address, purchase amount, associated issuing organization, issuing organization contact information (e.g., phone number, email address, fax number, etc.), phone number, and the like. In some implementations, the transaction processor may determine the issuing organization by comparing the credit card number (specifically, the BIN digits of the number) to a list of issuers and associated BIN numbers.

At step 470, the transaction processor may contact the issuer and the merchant. In an implementation, the transaction processor may use click-to-call techniques to contact the issuer and the merchant as part of a three-way call that may include the transaction processor. In other implementations, one or more point-to-point calls may alternatively be used, such as between the processor and the issuer, between the merchant and the processor, or between the merchant and the issuer. Any appropriate communication mechanism may be used, including, without limitation, phone calls, VoIP calls, fax communications, e-mail, SMS messaging, text messages, etc.

At step 475, customer information may be communicated to the issuer and may be withheld from the merchant. In an implementation, the transaction processor may mute the merchant from the call and may provide the issuer with information that may permit the issuer to determine that it may provide verification information. In an implementation, this information may be provided to the issuer in response to an issuer request for identification information, as to confirm that the requesting party has proper authorization. The issuer may determine that authorization is proper.

The transaction processor may then connect the merchant for communication with the issuer for verification of information associated with the order (step 480), and the process ends. In an implementation, the merchant may ask questions pertaining to the customer account with the issuer and the issuer may provide answers, according to an implementation. Based on the supplied answers, the merchant may be in better position to determine whether to proceed with finalizing the transaction. In another implementation, after receiving a verification request at step 465, the transaction processor may contact the issuer and provide the issuer with customer information to authorize verification disclosure, and may then communicably connect the merchant and issuer for verification of information associated with the order.

Figure 5:
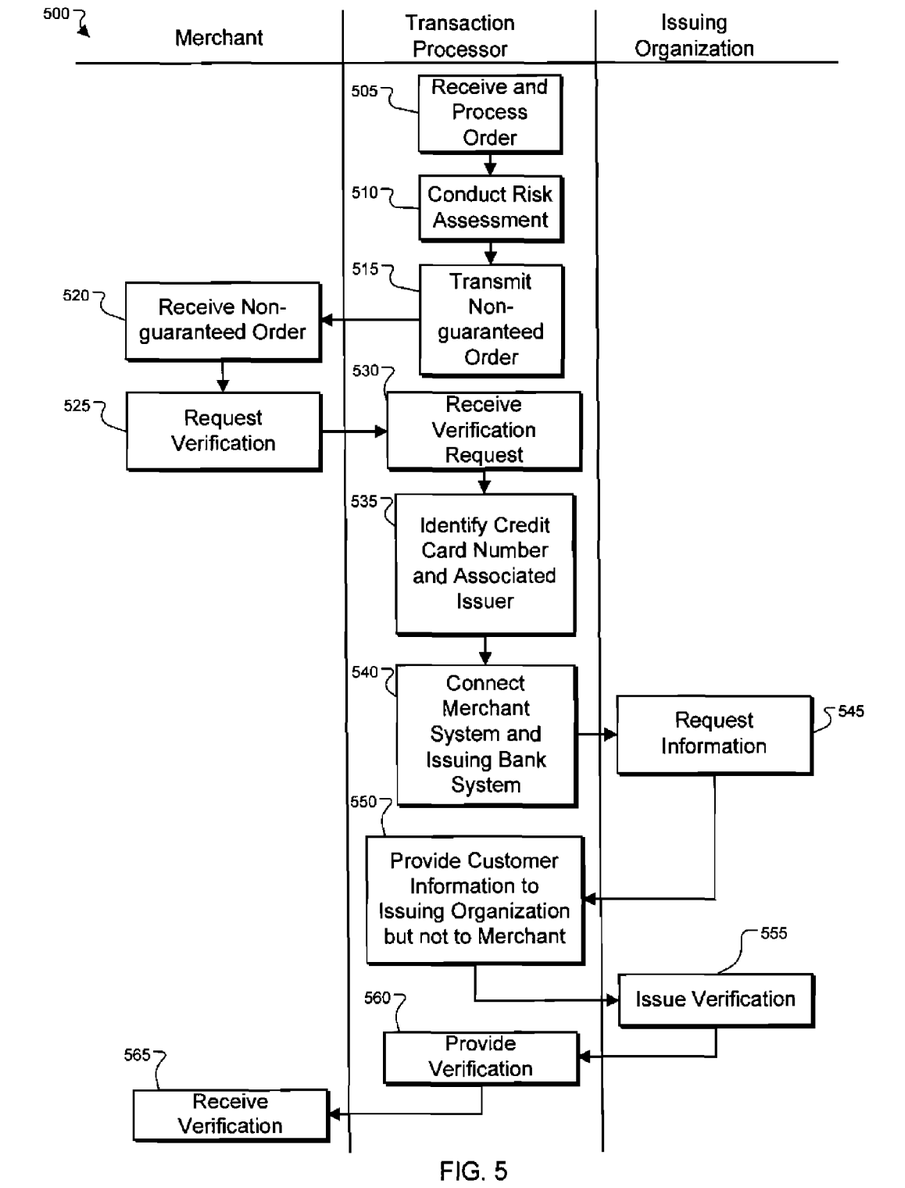
FIG. 5 is a flow chart of exemplary actions by a merchant, a transaction processor, and an issuing organization in a system that can be used for verifying payment information.

FIG. 5 is a flow chart 500 of exemplary actions by a merchant, a transaction processor, and an issuing organization in a system that can be used for verifying payment information. The transaction processor may receive and process an order at step 505. At step 510, the transaction processor may conduct a risk assessment on the order. In an implementation, the transaction processor may determine, as a result of the risk assessment, that the order is too risky to guarantee. The transaction processor may transmit information associated with the non-guaranteed order to the merchant at step 515, and the merchant may receive the non-guaranteed order at step 520. The merchant may request verification information at step 525, and the transaction processor may receive the request for verification information at step 530. The transaction processor may identify a credit card number and associated issuing organization at step 535. In an implementation, the issuing organization may previously have issued the customer an account that the customer is presently using to pay for the goods or services ordered. The transaction processor may connect the merchant system and the issuing organization at step 540. The issuing organization may request information at step 545, such as customer account information. At step 550, the transaction processor may provide the requested information to the issuing organization but not to the merchant. This may be done, for example, by muting the merchant from the call during the time when the transaction processor supplies the requested information to the issuing organization. The issuing organization may issue the verification at step 555, and the transaction processor may provide the verification to the merchant at step 560. The merchant may receive the verification at step 565. In some implementations, the issuing organization may provide the verification information directly to the merchant.

Figure 6:
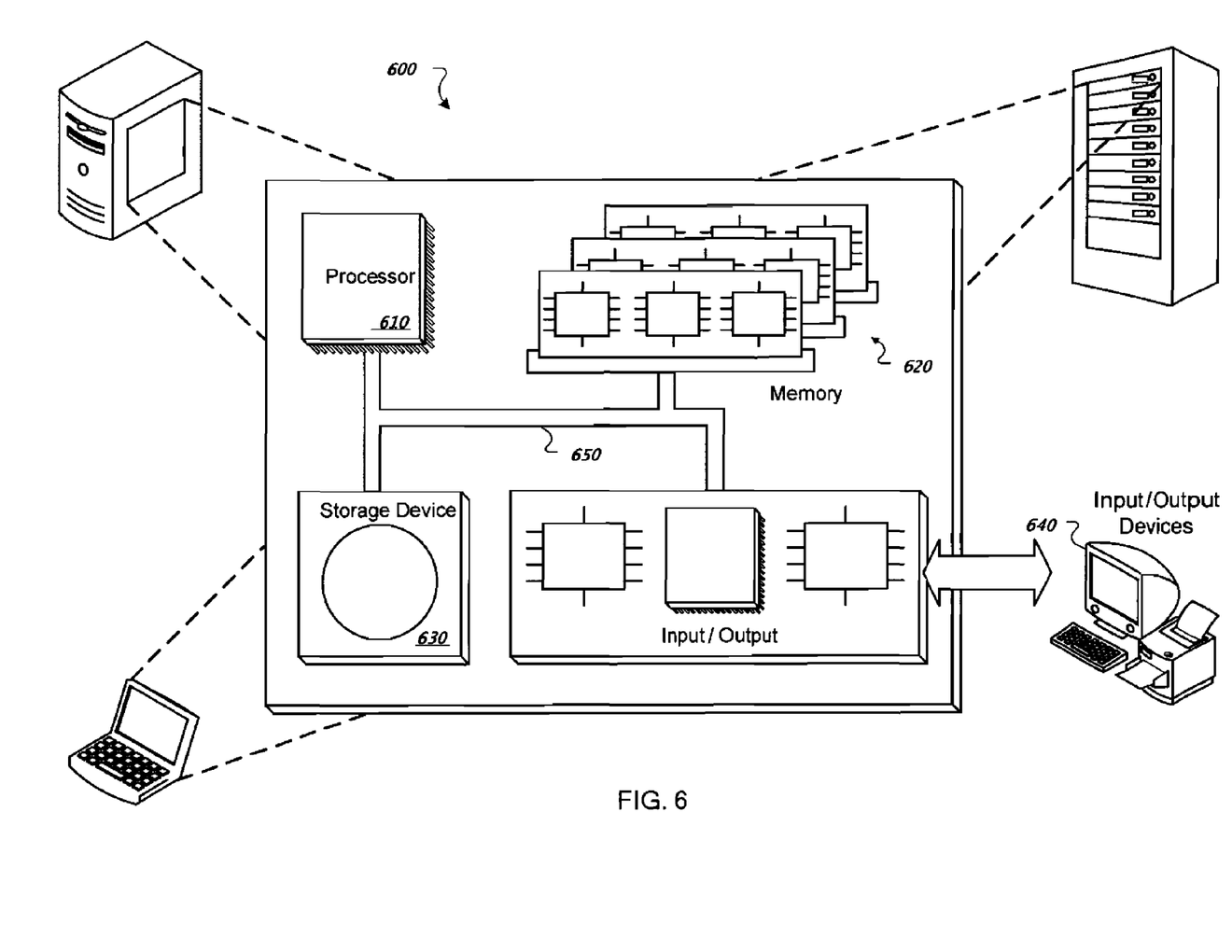
FIG. 6 is a schematic diagram of a computing system.

FIG. 6 is a schematic diagram of a computing system 600. The system 600 can be used for the operations described in association with any of the computer-implemented methods described previously, according to some implementations. In an implementation, the transaction processor 105 may operate on the computing system 600. Similarly, the system 600 may represent a computing system operating at the merchant site 110 or the issuer site 115, or may represent the customer computing device 125. Computing system 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the systems, methods, devices or techniques described and/or claimed in this document.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user, and a keyboard and a pointing device such as a mouse or a trackball by which the user can provide input to the computer.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the computers and networks forming the Internet.

The computing system can include clients and servers. A client and server are generally remote from each other and typically interact through a communication network. The relationship of client and server arises by virtue of computer programs running on the respective computers and having a client-server relationship to each other.

Various implementations of the systems and techniques described here can be realized in digital electronic circuitry, integrated circuitry, ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A computer-implemented method, comprising:
    receiving, by a computer server system, an order from a customer to purchase an item from a merchant;
    associating, by the computer server system, the order with an order identifier and customer account information associated with an account of the customer associated with an issuing organization;
    receiving, by the computer server system, a request for verification information from the merchant, the request including the order identifier;
    accessing, by the computer server system, the customer account information associated with the order using the received order identifier;
    establishing, by the computer server system, a voice connection between the computer server system, the merchant and the issuing organization;
    receiving, by the computer server system and from the issuing organization, a request for the customer account information;
    in response to receiving the request for customer account information from the issuing organization:
    blocking, by the computer server system, audio transmission to a merchant portion of the voice connection;
    communicating, by the computer server system, customer account information to the issuing organization while the audio transmission to the merchant portion is blocked;
    un-blocking, by the computer server system, the merchant portion of the voice connection after the customer account information has been communicated to the issuing organization; and
    after un-blocking the merchant portion of the voice connection, communicating, by the computer server system, verification information associated with the order from the issuing organization to the merchant through the un-blocked merchant portion of the voice connection.

2. The method of claim 1, wherein establishing the voice connection between the computer server system, the merchant and the issuing organization comprises establishing a voice-over-internet-protocol connection between the computer server system, the merchant and the issuing organization.

3. The method of claim 1, further comprising determining a risk value associated with the order.

4. The method of claim 3, further comprising advising that the order be completed or aborted based on the risk value.

5. The method of claim 1, wherein the customer account information includes a credit card number and wherein the issuing organization is associated with the customer because the issuing organization issued the credit card number to the customer.

6. The method of claim 1, wherein the customer account information includes a bank account number and wherein the issuing organization is associated with the customer because the issuing organization issued the bank account number to the customer.

7. The method of claim 1, wherein the verification information includes an address.

8. The method of claim 1, wherein the verification information includes credit card information.

9. The method of claim 1, further comprising assigning an indicator based on a communication between the merchant and the issuing organization.

10. One or more readable storage mediums storing instructions that, when executed by one or more processing devices, cause the one or more processing devices to perform the following operations:
    receiving, by a computer server system, an order from a customer to purchase an item from a merchant;
    associating, by the computer server system, the order with an order identifier and customer account information associated with an account of the customer associated with an issuing organization;
    receiving, by the computer server system, a request for verification information from the merchant, the request including the order identifier;
    establishing, by the computer server system, a voice connection between the computer server system, the merchant and the issuing organization;
    in response to receiving the request for customer account information from the issuing organization:
    blocking, by the computer server system, audio transmission to a merchant portion of the voice connection;
    communicating, by the computer server system, customer account information to the issuing organization while the audio transmission to the merchant portion is blocked;
    un-blocking, by the computer server system, the merchant portion of the voice connection after the customer account information has been communicated to the issuing organization;
    after un-blocking the merchant portion of the voice connection, communicating, by the computer server system, verification information associated with the order from the issuing organization to the merchant through the un-blocked merchant portion of the voice connection.

11. The one or more computer readable storage mediums of claim 10, wherein establishing the voice connection between the computer server system, the merchant and the issuing organization comprises establishing a voice-over-internet-protocol connection between the computer server system, the merchant and the issuing organization.

12. The one or more computer readable storage mediums of claim 10, further comprising instructions that when executed by the one or more processing devices cause the one or more processing devices to perform the following operation: determining a risk value associated with the order.

13. The one or more computer readable storage mediums of claim 12, further comprising instructions that when executed by the one or more processing devices cause the one or more processing devices to perform the following operation: advising that the order be completed or aborted based on the risk value.

14. The one or more computer readable storage mediums of claim 10, wherein the customer account information includes a credit card number and wherein the issuing organization is associated with the customer because the issuing organization issued the credit card number to the customer.

15. The one or more computer readable storage mediums of claim 10, wherein the customer account information includes a bank account number and wherein the issuing organization is associated with the customer because the issuing organization issued the bank account number to the customer.

16. The one or more computer readable storage mediums of claim 10, wherein the verification information includes an address.

17. The one or more computer readable storage mediums of claim 10, wherein the verification information includes credit card information.

18. The one or more computer readable storage mediums of claim 10, further comprising instructions that when executed by the one or more processing devices cause the one or more processing devices to perform the following operation: assigning an indicator based on a communication between the merchant and the issuing organization.

* * * * *